(12) United States Patent
Donato et al.

(10) Patent No.: US 8,996,622 B2
(45) Date of Patent: Mar. 31, 2015

(54) QUERY LOG MINING FOR DETECTING SPAM HOSTS

(75) Inventors: Debora Donato, Barcelona (ES);
Aristides Gionis, Barcelona (ES);
Claudio Corsi, Figline Valdarno (IT);
Paolo Ferragina, Pisa (IT)

(73) Assignee: Yahoo! Inc., Sunnyvale, CA (US)

( * ) Notice: Subject to any disclaimer, the term of this patent is extended or adjusted under 35 U.S.C. 154(b) by 843 days.

(21) Appl. No.: 12/241,731

(22) Filed: Sep. 30, 2008

(65) Prior Publication Data

US 2010/0082752 A1 Apr. 1, 2010

(51) Int. Cl.
*G06F 15/16* (2006.01)
*G06F 17/30* (2006.01)
*H04L 12/58* (2006.01)

(52) U.S. Cl.
CPC ........ *G06F 17/30861* (2013.01); *H04L 12/585* (2013.01); *H04L 51/12* (2013.01)
USPC ........... 709/206; 709/204; 709/207; 709/223; 709/226; 726/22; 726/23

(58) Field of Classification Search
CPC .... G06F 17/30861; G06F 15/16; H04L 51/12
USPC ...................... 709/204–207, 223–226; 707/3; 726/22–23
See application file for complete search history.

(56) References Cited

U.S. PATENT DOCUMENTS

| | | | |
|---|---|---|---|
| 6,272,507 B1 | 8/2001 | Pirolli et al. | |
| 6,556,983 B1 * | 4/2003 | Altschuler et al. | 706/55 |
| 7,509,344 B1 * | 3/2009 | Kamvar et al. | 1/1 |
| 7,567,534 B2 | 7/2009 | Takahashi et al. | |
| 7,568,211 B2 * | 7/2009 | Mai et al. | 725/35 |
| 7,975,301 B2 * | 7/2011 | Chayes et al. | 726/23 |
| 8,046,832 B2 * | 10/2011 | Goodman et al. | 726/23 |
| 2003/0050924 A1 * | 3/2003 | Faybishenko et al. | 707/3 |
| 2004/0064515 A1 * | 4/2004 | Hockey | 709/206 |
| 2005/0015455 A1 * | 1/2005 | Liu | 709/207 |
| 2005/0015626 A1 * | 1/2005 | Chasin | 713/201 |
| 2005/0216770 A1 * | 9/2005 | Rowett et al. | 713/201 |
| 2005/0262209 A1 * | 11/2005 | Yu | 709/206 |
| 2006/0004748 A1 * | 1/2006 | Ramarathnam et al. | 707/6 |
| 2006/0074870 A1 * | 4/2006 | Brill et al. | 707/3 |
| 2006/0184394 A1 * | 8/2006 | Maughan | 707/6 |
| 2006/0184511 A1 * | 8/2006 | Koo et al. | 707/3 |
| 2006/0200523 A1 * | 9/2006 | Tokuda et al. | 709/206 |

(Continued)

OTHER PUBLICATIONS

ACM SIGIR Forum archive vol. 40, Issue 2 (Dec. 2006) table of contents pp. 11-24 Year of Publication: 2006 ISSN:0163-5840.*

(Continued)

*Primary Examiner* — Razu Miah
(74) *Attorney, Agent, or Firm* — Weaver Austin Villeneuve & Sampson LLP

(57) ABSTRACT

Disclosed are methods and apparatus for detecting spam hosts. In one embodiment, one or more graphs are generated using data obtained from a query log, where the one or more graphs include at least one of an anticlick graph or a view graph. Values of one or more syntactic features of the one or more graphs are ascertained. Values of one or more semantic features of the one or more graphs are determined by propagating categories from a web directory among nodes in each of the one or more graphs. Spam hosts are then detected based upon the values of the syntactic features and the semantic features.

20 Claims, 8 Drawing Sheets

(56) References Cited

U.S. PATENT DOCUMENTS

| | | | | |
|---|---|---|---|---|
| 2006/0253466 | A1* | 11/2006 | Upton, IV | 707/100 |
| 2006/0253581 | A1* | 11/2006 | Dixon et al. | 709/225 |
| 2007/0088789 | A1* | 4/2007 | Berman | 709/206 |
| 2007/0113241 | A1* | 5/2007 | Mai et al. | 725/10 |
| 2007/0204026 | A1* | 8/2007 | Berger | 709/223 |
| 2007/0209074 | A1* | 9/2007 | Coffman | 726/23 |
| 2008/0082655 | A1* | 4/2008 | Goswami | 709/224 |
| 2008/0221986 | A1* | 9/2008 | Soicher et al. | 705/14 |
| 2008/0222726 | A1* | 9/2008 | Chayes et al. | 726/23 |
| 2009/0063371 | A1* | 3/2009 | Lin | 706/10 |
| 2009/0063665 | A1* | 3/2009 | Bagepalli et al. | 709/222 |
| 2009/0089244 | A1* | 4/2009 | Donato et al. | 707/3 |
| 2009/0089285 | A1 | 4/2009 | Donato et al. | |
| 2009/0094671 | A1* | 4/2009 | Kurapati et al. | 726/1 |
| 2009/0216868 | A1* | 8/2009 | Gao et al. | 709/223 |
| 2009/0254989 | A1* | 10/2009 | Achan et al. | 726/22 |
| 2009/0259646 | A1* | 10/2009 | Fujita et al. | 707/5 |
| 2010/0057687 | A1* | 3/2010 | Shen et al. | 707/3 |
| 2010/0082694 | A1 | 4/2010 | Corsi et al. | |

OTHER PUBLICATIONS

Annual ACM Conference on Research and Development in Information Retrieval archive Proceedings of the 30th annual international ACM SIGIR conference on Research and development in information retrieval table of contents Amsterdam, The Netherlands Session: Spam spam spam table of contents pp. 423-430 Year of Publication: 2007 ISBN:978-1-59597-7.*

Corsi et al., "Query Log Mining for Detecting Spam-Attracting Queries" U.S. Application filed on Sep. 30, 2008.

Social Media Research Blog: Query-log mining for detecting polysemy and spam, dated Aug. 24, 2008, http://socialmedia.typepad.com/blog/2008/08/query-log-mining-for-detecting-polysemy-an . . . (1 pg.).

IW3C2 (International World Wide Web Conferences Steering Committee), The Sad Truth about Query Log Research, dated Jan. 3, 2007, http://www.iw3c2.org/blog/2007/01/03/the-sad-truth-about-query-log-research-www2007- . . . (2 pgs.).

Hafner, Katie, "Researchers Yearn to Use AOL Logs, but They Hesitate"—New York Times article published Aug. 23, 2006 http://www.nytimes.com/2006/08/23/technology/23search/html?ei=5088&en=cc878412ed . . . (6 pgs.).

What is Spam? printed on Sep. 26, 2008, http://spam/abuse.net/overview/whatisspam.shtml (1 pg.).

Submitting a Site to the Open Directory Project printed on Sep. 26, 2008, http://www.dmoz.org/add.html (4 pgs.).

Castillo, et al., "Query-Log Mining for Detecting Spam", *AIRWeb* '08, Apr. 22, 2008, Beijing, China (4 pgs).

Creswell, et al., "Random Walks on the Click Graph", *SIGIR* '07, Jul. 23-27, 2007, Amsterdam, The Netherlands (8 pgs).

Non-Final Office Action dated Jun. 11, 2010, from related U.S. Appl. No. 12/242,099.

US Non-Final Office Action dated Dec. 9, 2010, from U.S. Appl. No. 12/242,099.

US Final Office Action dated Aug. 11, 2011, from U.S. Appl. No. 12/242,099.

* cited by examiner

QUERY LOG MINING FOR DETECTING SPAM HOSTS

BACKGROUND OF THE INVENTION

The present invention relates generally to computer implemented detection of spam hosts.

Every day, millions of users search for information on the web via search engines. Through their interaction with search engines, not only are they able to locate the information they are looking for, but they also provide implicit feedback on the results shown in response to their queries by clicking or not clicking onto the search results.

Nowadays search engines can record query logs that keep various types of information about which documents (e.g., web pages or web sites) users click for which query. Such information can be seen as "soft" relevance feedback for the documents that are clicked as a result of specific queries. This "soft" relevance feedback may be used to generate a score associated with these documents that indicates the relevance of the documents to a particular query. This score may then be used by search engines to provide the most relevant documents in response to queries. Unfortunately, some web pages include terms that are intended to mislead search engines so that a greater number of users will view the web sites. Accordingly, the score associated with some of these documents may be undeserved. The web pages or web sites that have received these undeserved scores are often referred to as spam hosts.

In view of the above, it would be beneficial if improved methods of detecting spam hosts could be implemented.

SUMMARY OF THE INVENTION

Methods and apparatus for detecting spam hosts are disclosed. In accordance with various embodiments, one or more query graphs are generated using data obtained from a query log. These graphs may then be used to generate values of syntactic and/or semantic features. The values of these semantic and/or semantic features may then be used to detect spam hosts.

In one embodiment, one or more graphs are generated using data obtained from a query log, where the one or more graphs include at least one of an anticlick graph or a view graph. The graphs may also include a click graph. Values of one or more syntactic features of the one or more graphs are ascertained. Values of one or more semantic features of the one or more graphs may be determined by propagating categories from a web directory among nodes in each of the one or more graphs. Spam hosts are then detected based upon the values of the syntactic features and the semantic features.

In another embodiment, one or more graphs are generated using data obtained from a query log, the one or more graphs including at least one of an anticlick graph or a view graph. Categories from a web directory are propagated among nodes in each of the one or more graphs. Values of one or more semantic features of the one or more graphs are determined after propagating categories among the nodes. Spam hosts are then detected based upon the values of the semantic features.

In accordance with one aspect of the invention, an anticlick graph defines and/or illustrates an issued query and the documents in the search results that are not clicked by the user. Specifically, the documents are not clicked by the user, but are ranked in the search results before the first clicked document. In other words, the documents that are not clicked have been intentionally not clicked by the user.

In accordance with another aspect of the invention, the view graph defines and/or illustrates an issued query and each document in the search results that are "viewed" by the user. Those documents that are viewed may include those documents that are presented in the search results, including those documents that are clicked and those documents that are not clicked by the user.

In accordance with yet another aspect of the invention, the graphs may include a click graph. The click graph is an undirected labeled bipartite graph including a first set of nodes $V_Q$ representing queries, a second set of nodes $V_D$ representing documents, and a set of edges E. An edge may be represented by a line connecting a query node to a document node, which indicates that at least one user who submitted that query subsequently clicked on the results document. Each edge may be further associated with a weight that indicates how many times the query led a user to click on the document or how many distinct users clicked on the document after submitting the query.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In the following description, a document may be defined as a Uniform Resource Locator (URL) that identifies a location at which the document can be located. The document may be located on a particular web site, as well as a specific web page on the web site. For instance, a first URL may identify a location of a web page at which a document is located, while a second URL may identify a location of a web site at which the document can be located.

In recent years, the Internet has been a main source of information for millions of users. These users rely on the Internet to search for information of interest to them. One conventional way for users to search for information is to initiate a search query through a search service's web page. Typically, a user can enter a query including one or more search term(s) into an input box on the search web page and then initiate a search based on such entered search term(s). In response to the query, a web search engine generally returns an ordered list of search result documents.

Figure 1:
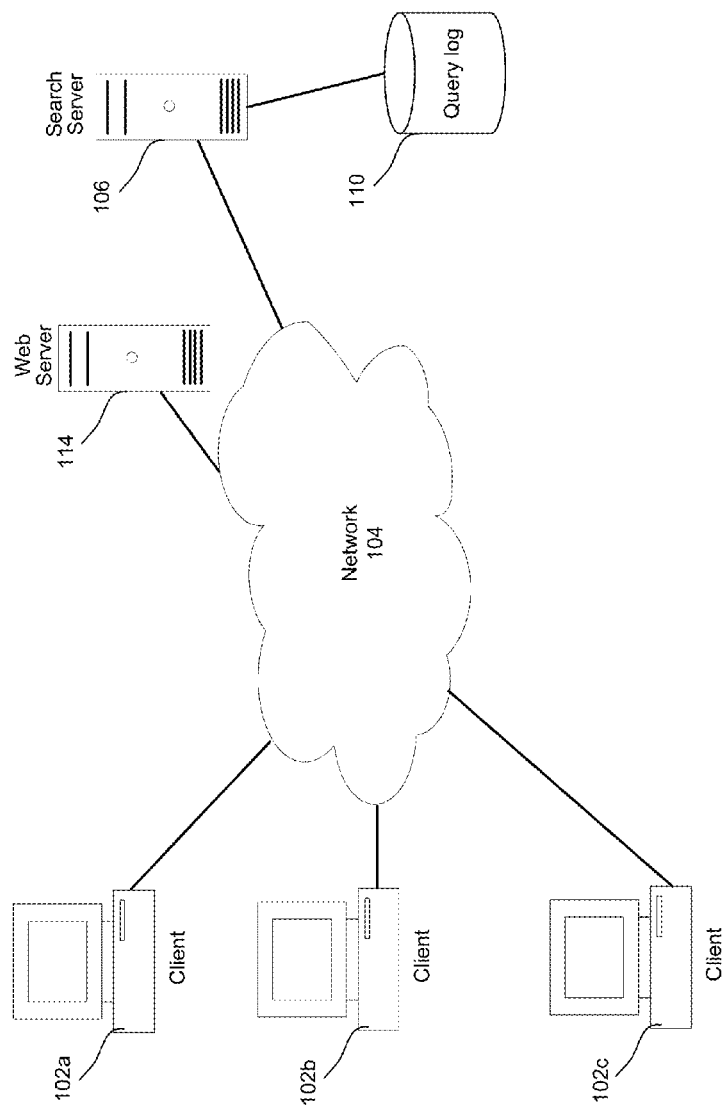
FIG. 1 is a block diagram illustrating an example system in which various embodiments may be implemented.

FIG. 1 illustrates an example network segment in which various embodiments of the invention may be implemented. As shown, a plurality of clients 102a, 102b, 102c may access a search application, for example, on search server 106 via network 104 and/or access a web service, for example, on web server 114. The network may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The invention may also be practiced in a wide variety of network environments (represented by network 104) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A search application generally allows a user (human or automated entity) to search for information that is accessible via network 104 and related to a search query including one or more search terms. The search terms may be entered by a user in any manner. For example, the search application may present a web page having any input feature to the client (e.g., on the client's device) so the client can enter a query including one or more search term(s). In a specific implementation, the search application presents an input box into which a user may type a query including any number of search terms. Embodiments of the present invention may be employed with respect to any search application. Example search applications include Yahoo! Search, Google, Altavista, Ask Jeeves, etc. The search application may be implemented on any number of servers although only a single search server 106 is illustrated for clarity.

The search server 106 (or servers) may have access to one or more query logs 110 into which search information is retained. Each time a user performs a search on one or more search terms, information regarding such search may be retained in the query logs 110. For instance, the user's search request may contain any number of parameters, such as user or browser identity and the search terms, which may be retained in the query logs 110. Additional information related to the search, such as a timestamp, may also be retained in the query logs 110 along with the search request parameters. When results are presented to the user based on the entered search terms, parameters from such search results may also be retained in the query logs 110. For example, the specific search results, such as the web sites, the order in which the search results are presented, whether each search result is a sponsored or algorithmic search result, the owner (e.g., web site) of each search result, whether each search result is selected (i.e., clicked on) by the user (if any), and a timestamp may also be retained in the query logs 110.

Spam is typically defined as a spam-host. In this application, we define another type of spam. Specifically, we refer to a spam-attracting query as a query that has a result set that includes a large number of spam hosts (e.g., web spam pages).

The implicit feedback provided by users when they click (or don't click) on various search results is typically recorded by a search engine in the form of a query log that includes a sequence of search actions, one per user query. Each search action may include one or more terms composing a query, one or more documents returned by the search engine, one or more documents that have been clicked, the rank of the document(s) that have been clicked, the rank of the documents in the list of search results, the date and/or time of the search action/click, and/or an anonymous identifier for each search session, a user identifier associated with the query, etc.

In accordance with one embodiment, documents and/or queries represented in a query log may be characterized in order to provide improved methods for detecting spam. More specifically, improved methods may be implemented for detecting spam at the document level, as well as the query level. In order to improve algorithms for detecting spam, query graphs such as the click graph, the view graph, and/or the anti-click graph may be used to characterize queries and documents, as will be described in further detail below.

The information in a query log may be organized in the form of a graph structure such as a query-log graph, also known as a click graph. The click graph is an undirected labeled bipartite graph including a first set of nodes $V_Q$ representing queries, a second set of nodes $V_D$ representing documents, and a set of edges E. An edge may be represented by a line connecting a query node to a document node, which indicates that at least one user who submitted that query subsequently clicked on the results document. Each edge may be further associated with a weight that indicates how many times the query led a user to click on the document or how many distinct users clicked on the document after submitting the query.

Unfortunately, a click graph is typically sparse because many relevant documents have been possibly not clicked by users, and is also noisy because many non-relevant documents may have been clicked. Thus, it is beneficial to introduce different types of graphs that are more informative: the view graph and the anti-click graph. It is important to note that these two types of graphs use different definitions of an edge. The view graph defines an edge between the issued query and each document proposed in the answer list and "viewed" by (e.g., presented to) the user. More specifically, those documents that are viewed by the user may include those documents that have been clicked and those documents that have not been clicked by the user. The anti-click graph instead defines an edge between a query and all the proposed documents not clicked by the user. Those documents that are not clicked may be identified as those documents that are both not clicked by (e.g., selected by) the user and being ranked in the answers list before a clicked document (e.g., the first clicked document).

Figure 2A:
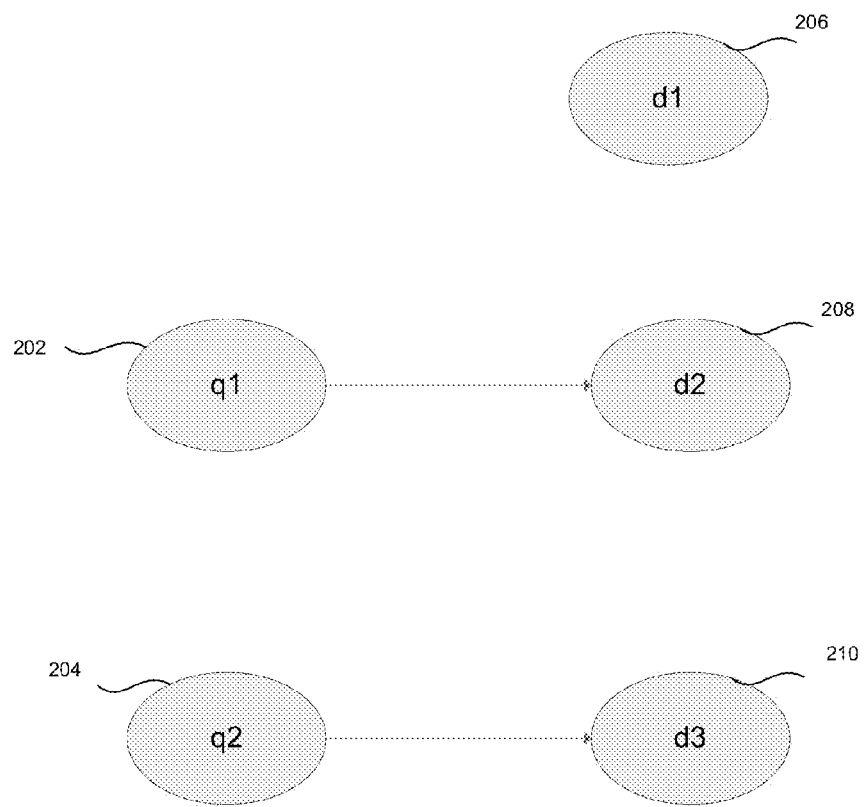
FIGS. 2A-2C are diagrams illustrating example graphs that may be used to generate information for use in detecting spam queries or spam hosts.
Figure 2B:
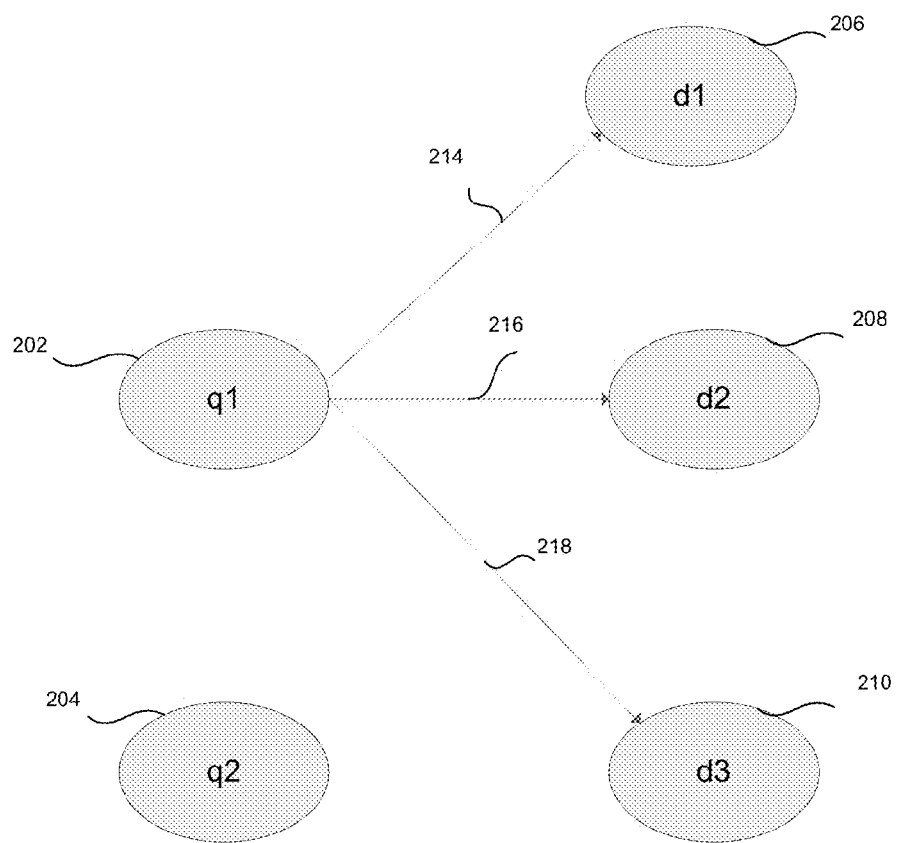
Figure 2C:
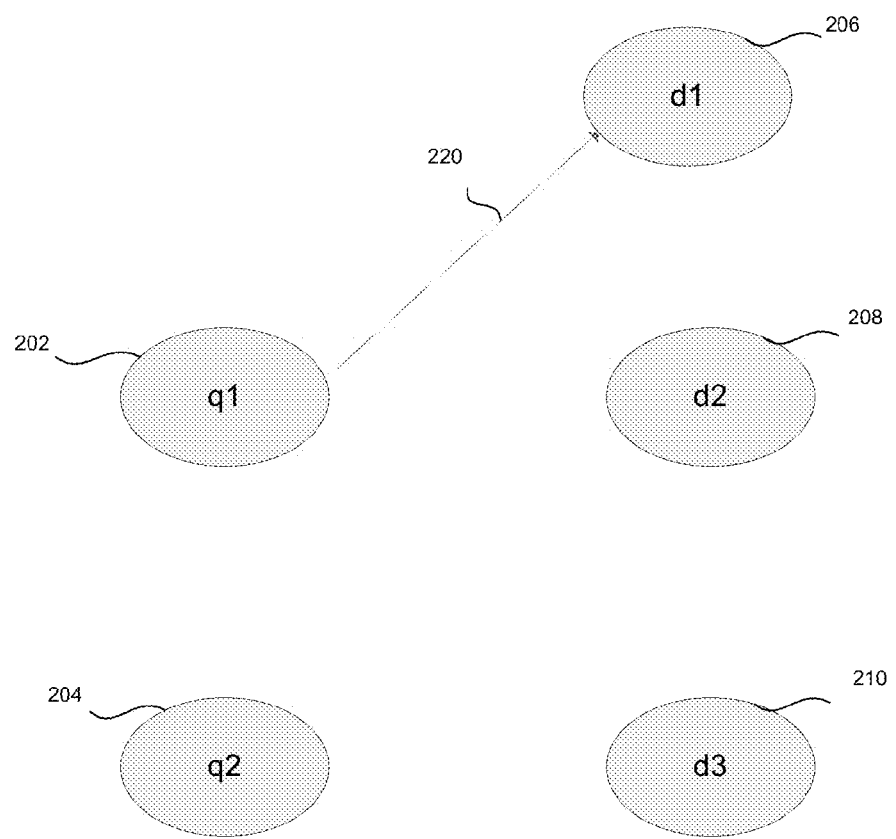

FIGS. 2A-2C are diagrams illustrating example graphs that may be used to generate information for use in detecting spam queries or spam hosts. FIG. 2A shows a click-graph. The click-graph is an undirected, weighted and labeled bipartite graph, including a set of nodes and a set of edges. The set of nodes may include a set of query nodes 202, 204 and a set of document nodes 206, 208, 210. An edge 212, shown as a line connecting a query node q to a document node d, denotes the fact that the query q has led some user to click on the document d.

Various variants of the query-log graph may be defined. This may be accomplished by defining different sets of edges. For example, when a user submits a query, an answer list of documents may be provided. The documents on which the user clicks represent the click records. All of the documents presented to the user represent the view records. Using this definition, we introduce the concept of the view graph, shown in FIG. 2B. Each of the edges 214, 216, 218 in the view graph represents those documents presented to a user (e.g., in an answer list of documents) in response to the corresponding query. Since each click is also a view, the view graph contains the click graph. However, the view graph is more noisy because it does not contain any user feedback. Nonetheless, the view graph can still be useful to detect spam sites, since spam sites try to be in the answer lists of different queries, even though users do not necessarily click on those spam sites.

Finally, it is also possible to leverage the negative feedback that is present in the query log. This may be accomplished by generating an anti-click graph such as that shown in FIG. 2C. In an anti-click graph, an edge 220 may represent those documents that are presented to a user (e.g., in an answer list of documents) in response to the corresponding query, but are not clicked on by the user. More specifically, an edge (e.g., a line between a query q and a document d) in an anti-click graph may be defined when (i) the document d appeared in the top r positions of the ranked list of results for the query q, (ii) the user who submitted the query q did not click on the document d, but (iii) the user clicked on another document ranked below the document d. The anti-click graph captures the negative judgment that users give implicitly to the top r ranked documents when they ignore them by clicking on documents ranked below.

In accordance with one embodiment, the set of document nodes in the click graph, the view graph, and the anti-click graph can be substituted with the corresponding set of hosts, which may be derived from the URL of the documents in the query log. In this manner, the set of document nodes can be replaced with the smaller set of hosts to which those documents belong. As a result, each query graph (the click graph, the view graph, and the anti-click graph) may be represented in two different versions: document-based and host-based. As a result, six different query graphs may be generated.

In order to use one or more query graphs in the spam detection process, we may associate a weight to an edge of a query graph that denotes the strength of the relation between the query q and the document d. A first weight may indicate the number of times the query q led a user to click on the document d. A second weight may indicate the number of distinct search sessions in which the query q led a user to click on the document d.

Other information in the query graph(s) that may be pertinent to spam detection is the distance between two different nodes (e.g., the length of the shortest path connecting the two nodes). We can denote by $N_k(x)$ a set of nodes in the query graph that lie at a distance exactly k from node x. Similarly, we can denote by $N_{\leq k}(x)$ a set of nodes in the query graph that lie at distance at most k from node x.

From information obtained from one or more query graphs, we may define features that can be used for spam detection. More specifically, a set of syntactic features and a set of semantic features are proposed. The set of syntactic features may include features (e.g., functions) for the document (or host) nodes of the graphs. Specifically, these syntactic features may include functions that are applied on the degree of the document (or host) nodes. The semantic features attempt to capture the semantic diversity of queries that lead to potential spam pages.

Syntactic Features

Various syntactic features may be defined for a particular query graph. For instance, the degree of a node may be defined for a document (or host) node, as well as a query node. More specifically, for each document d, the degree of the document node, which may be represented by $|N_1(d)|$, is the number of queries that are adjacent to the document d. This feature may provide a "good description" of the content of the document d. Similarly, for each query q, the degree of the query node, which may be represented by $|N_1(q)|$, is the number of distinct documents that are adjacent to (e.g., clicked for) the query q. In this example, adjacency is defined by a distance of 1. However, it is important to note that adjacency may be defined by a different (e.g., greater) distance.

In addition, we may identify popular elements (e.g., queries, query terms, and/or documents) based on frequencies by defining the following metrics (i.e., features).

For each document d, we may define $topQ_x(d)$ as the set of queries adjacent to d in the document-based query graph and being among the fraction x of the most frequent queries in the query log. For example, we may choose x=0.01, where $topQ_{1.0}(d)=N_1(d)$. Thus, a first syntactic feature may be the cardinality $|topQ_x(u)|$, where u is a document d (or a host h where the query graph is host-based rather than document-based). Specifically, for each host h, we may define $topQ_x(h)$ as the set of queries adjacent to host h in a host-based query graph and being among the fraction x of the most frequent queries in the query log.

For each document d, we may define $topT_y(d)$ as the set of query terms (except stop words) that compose the queries adjacent to the document d in the document-based query graph and being among the top y percent most frequent terms in the query log. (Stop words are generally understood to be common words that are considered not to be informative about the content of a document. Examples of stop words include "a" and "the.") For example, we may choose y=1%, where $topT_{100}(u)$ is the dictionary of all query terms (except stop words). Thus, a second syntactic feature may be the cardinality $|topT_y(u)|$, where u is a document d (or a host h where the query graph is host-based rather than document-based). Specifically, for each host h, we may define $topT_y(h)$ as the set of query terms (except stop words) that compose the queries adjacent to the host h in the host-based query graph and being among the top y percent most frequent terms in the query log.

The larger the value of the two syntactic features, the strong and wider should be the query attractiveness of the document (or host) and thus the more evident it should be that the document is a spam page (or the host is a spam host).

Semantic Features

Document-Based Query Graphs:

First, a subset of documents in a document-based query graph that can be found in a web directory such as the Open Directory Project (DMOZ) may be categorized. DMOZ is a human-edited hierarchy of categories. DMOZ includes a plurality of categories in which a number of pages are categorized. The information in this web directory can be leveraged by categorizing a subset of the documents in the click graph using DMOZ. It is important to note that although DMOZ is discussed in this example, any directory that includes a plurality of categories may be used to categorize documents. Another example of such a directory is Yahoo! directory.

Second, since human-edited resources such as DMOZ provide low-coverage, the category labels applied to the subset of documents in the graph can be propagated to previously unlabeled documents in the graph, as well as queries represented in the graph. Specifically, the category labels can be propagated through the edges back to the correspondent queries, and from the queries forward to other unlabeled documents. Through this propagation algorithm, queries and documents may obtain a probability distribution over all possible category labels. Each category may have an assignment strength denoting the relation between the query/document node content and the category label. This distribution can be used to generate semantic features for detecting spam hosts or spam attracting queries.

Host-Based Query Graphs:

First, a subset of hosts in a host-based query graph that can be found in a web directory such as the Open Directory Project (DMOZ) may be categorized. DMOZ includes a plurality of categories in which a number of web pages are categorized. The information in this web directory can be leveraged by categorizing a subset of the hosts in the graph using DMOZ. Specifically, this may be accomplished by categorizing the web pages of the host using DMOZ. Of course, it is important to note that other web directories may be used instead of DMOZ.

Second, the category labels applied to the subset of hosts in the graph can be propagated to previously unlabeled hosts in the graph, as well as queries represented in the graph. Specifically, the category labels can be propagated through the edges back to the correspondent queries, and from the queries forward to other unlabeled documents. Through this propagation algorithm, queries and hosts may obtain a probability distribution over all possible category labels. Each category may have an assignment strength denoting the relation between the query/host node content and the category label. This distribution can be used to generate semantic features for detecting spam hosts or spam attracting queries.

Category Tree

Through the use of a category structure such as a category tree, we can detail the information that may be computed for each query graph node. Specifically, this information may be computed for each node in document-based and/or host-based query graphs (e.g., click graph, view graph, and/or anti-click graph).

Let $T_L$ be the DMOZ category tree underlying the DMOZ directory, pruned to its top L levels. We assume that every node (e.g., document) of $T_L$ has an associated category and a score. Our goal is to associate a category tree $T_L(v)$ (which may be a tree, or may merely identify one or more leaf nodes) with each node (i.e., vertex) v of the query graph in such a way that each score, denoted by $score_v(c)$, associated with the node v's category c denotes the strength of the relation between the node v's content and category c's topic. As set forth above, a document-based query graph will include query nodes and document nodes, while a host-based query graph will include query nodes and host nodes. Thus, the nodes v may include query nodes and document nodes (where the query graph is document-based), or query nodes and host nodes (where the query graph is host-based).

The following will describe the calculation of the category trees of nodes with reference to a document-based query graph. However, it is important to note that the process can easily be applied to a host-based query graph by replacing the document nodes with host nodes.

In order to compute the category trees for all graph nodes v, we can initialize a category tree associated with each graph node to zero. We can then determine whether one or more document nodes d of the graph is assigned to a category c of DMOZ. If so, we increment by 1 the score of the category c and all of its ancestors in the category tree $T_L(v)$ associated with the one or more document nodes. If the category c occurs deeper than level L in DMOZ, then we may take its deepest ancestor at level L and perform the above updates on the category tree $T_L(v)$ on the node at level L (and its ancestors). Scores can be significantly greater than 1 because of the truncation process and of the possible multiple occurrences of a document in DMOZ. In one embodiment, we may normalize all scores of each category tree such that $\Sigma_{c' \in child(c)} score_c(c')=1$, where c' is a sub-topic of the category c. Then we can look at $score_v(c)$ as the probability that a node v (e.g., document, query, or host) is about a sub-topic c', given the fact that the node is about c.

Given the score values $score_v(c)$ we can define $score'_v(c)$, which captures the probability of reaching a category node of $T_L(v)$ (e.g., the probability that a document or host v is about a particular category), when one starts at the root of $T_L(v)$ and moves downwards according to the scores $score_v(c)$. In particular, for the root node r of $T_L(v)$, we define $score'_v(r)=1$ for all v, and for an i-th level node c, i=1, ..., L, we can recursively define $score'_v(c)=score'_v(\pi(c)) \times score_v(c)$, where $\pi(c)$ is the parent of c in $T_L(v)$, that is, an (i-1)-th level node.

Two different algorithms for the tree propagation process are set forth below. Through either of these processes, category labels and scores may be associated with each node v in a query graph.

Tree Propagation

Tree-Based Propagation by Weighted Average

If $score_v(c)>0$, then category c is a pertinent description of the node v's content, because the node v occurs in category c within the web directory (e.g., DMOZ). Now consider the nodes $N_t(v)$ at a distance t from the node v in the query graph. We expect that the larger the distance t, the less likely that the category c is a topic of the nodes $N_t(v)$. We may sum the scores over multiple paths, but also reduce the total sum with the lengths of those paths. In order to take into account all of the scores over multiple paths, but also consider the lengths of those paths, we can propagate the category scores through the graph by "increasing" a score according to an edge weight, and reducing a score according to a propagation distance (e.g., distance t). This way, the value of a $score_v(c)$ will be large if there is a large volume of short paths that start from a node u with $score_u(c)>0$ and end at a node v.

We can implement these ideas as follows. We can obtain a total sum of the scores as the distance i from the node u increases from 0 to the distance t. At each distance, we can scan through the nodes v in the graph and update the scores of all categories c in $T_L(v)$ according to the following formula:

$$score_v^{i+1}(c) \mathrel{+}= \alpha^{i-1} \sum_{(v',v) \in E} score_{v'}^i(c) x f(v', v)$$

where $score_v^0(c) = score_v(c)$, f is a decreasing function set to $\log_2(1+w(v',v))$, and $\alpha$ is a damping factor that takes into account the fact that the relatedness between two nodes at a distance t from one another in the graph decays with the distance t. In one embodiment, the damping factor $\alpha$ is set to 0.85.

Propagation by Random Walk

In accordance with another embodiment, we can execute a propagation of categories (e.g., labels and/or scores) based upon a method such as a random walk. This may be accomplished by flattening at least a portion of the category structure (e.g., category tree). For instance, a specific number N (e.g., 17) of the top-level categories in DMOZ may be flattened.

For a given category c, the random-walk approach may model the behavior of a random surfer that walks through the graph among the nodes (e.g., from queries to documents/hosts, and from documents/hosts to queries). The way the surfer chooses the next node among the nodes adjacent to the current node (being either a document/host or a query) depends upon the popularity among the search-engine users. The popularity may be ascertained by the edge weight w along the path to each possible next node. For example, the edge weight may be defined either in terms of number of clicks and/or on the number of distinct search sessions. As the surfer reaches a node, we may calculate $score_v'(c)$, which indicates the probability of reaching that particular category, as set forth above.

This process may be repeated for each of the categories in the web directory (e.g., DMOZ) in the top N top-level categories. The result of this process is a category tree for each node in the query graph, where each node in the category tree indicates a probability of reaching the corresponding category over all the considered categories (e.g., those in the N top-level categories) for that node.

Using either of the methods set forth above, upon completion of the propagation of categories for each category tree, a category tree associated with each node of the query graph will indicate a degree to which each of the categories defines the node. In the above description, a category tree is used to define a degree to which each of a plurality of categories defines a particular node. Of course, other data structures may be used in order to ascertain and indicate a degree to which each of a plurality of categories defines a node (e.g., document, host, or query).

Measures of Dispersion

The category tree $T_L(v)$ associated with a node may be used to determine the semantic spread of the node. The semantic spread of a node may be represented by one or more dispersion measures.

For example, we may fix a level i in $T_L(v)$ and consider the conditional entropy:

$$H_i(v) = - \sum_{level(c)=i-1} p(c) \sum_{c' \in child(c)} p(c'|c) \log_2(c'|c),$$

where c ranges among the level (i-1) nodes of the web directory (e.g., DMOZ), and $$p(c'|c) = \frac{score_u(c')}{\sum_{x \in child(c)} score_u(x)}$$

is the probability of reaching node x given that we are at its parent node c. Therefore, $H_i(v)$ measures the uncertainty of selecting a category at level l given that we are at some category at level (i-1). Having fixed the maximum depth of the trees to L=2, we define a first measure of dispersion as follows:

$$H(v) = \beta H_1(v) + (1-\beta) H_2(v). \quad (1)$$

In this case, if $\beta=0$ then the distribution among the level 2 categories dominates; if $\beta=1$ then the distribution among the level 1 categories dominates; finally, if $\beta=0.5$ then H(v) is half of the joint entropy of the first two levels of $T_L(v)$. Therefore, by setting $\beta=0.75$ we give a preference to the distribution in the level-1 categories.

In a similar way, we can define a second measure of the semantic coverage of a node in the graph, called joint entropy (HJ). Considering the category nodes c on level 2 of the category tree $T_L(V)$, we can compute their joint probability as p(c)=p(c|parent(c))p(parent(c)) using the formula set forth above. More specifically, we can compute p(c'|c) defined above, where c' is c, and c is the parent(c). Once p(c'|c) is computed in this manner, it may be multiplied by p(parent (c)), which is the probability of reaching the parent(c) as represented by the score at parent(c) in the category tree $T_L(v)$. We can then apply the standard entropy function over the resulting probability distribution to obtain the joint entropy by computing $\Sigma p^* \log(1/p)$.

As a third semantic feature, we can compute the entropy over the node probabilities computed in the propagation based on random walk, which we can refer to as $H_p$.

Figure 3:
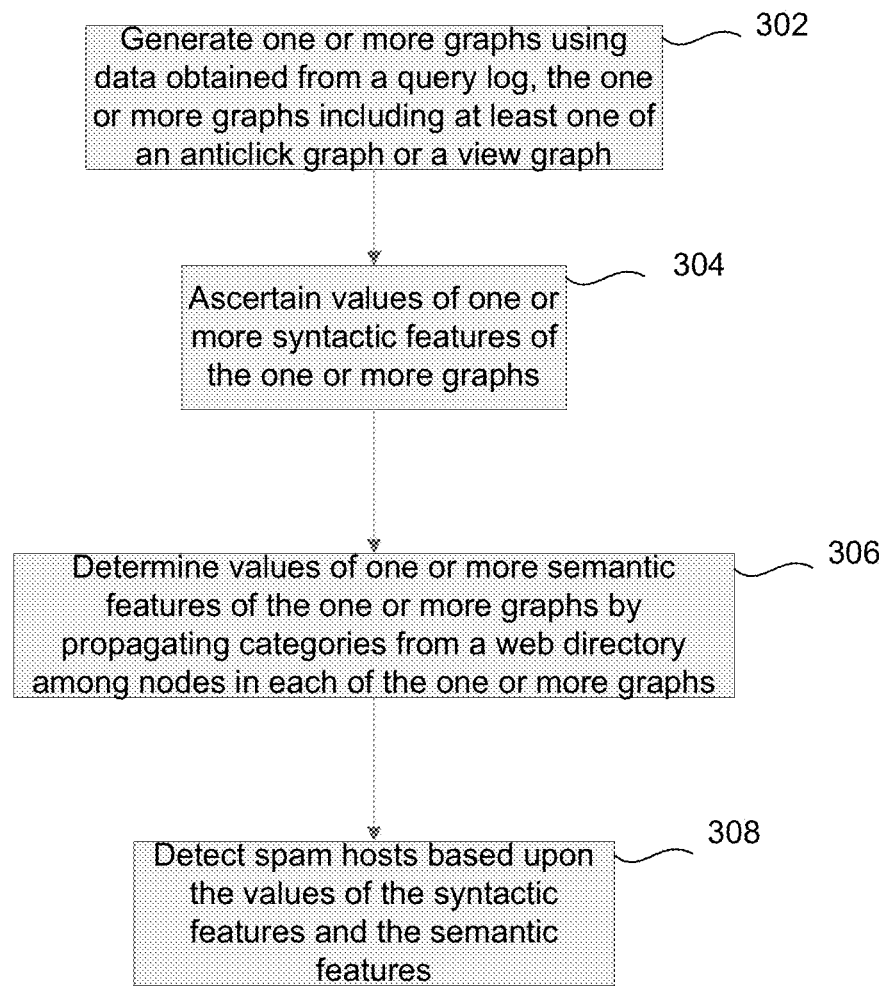
FIG. 3 is a process flow diagram illustrating an example method of detecting spam hosts.

FIG. 3 is a process flow diagram illustrating an example method of detecting spam hosts in accordance with one embodiment. The system may generate one or more graphs using data obtained from a query log at 302, where the one or more graphs include at least one of an anticlick graph or a view graph. More particularly, the graphs may include a click graph, an anticlick graph, and/or a view graph. The system may ascertain values of one or more syntactic features of the one or more graphs at 304. The system may also determine values of one or more semantic features of the one or more graphs by propagating categories from a web directory among nodes in each of the one or more graphs at 306. For example, the semantic features may be determined with respect to document nodes (in a document-based query graph) and/or host nodes (in host-based query graph). The system may then detect spam hosts based upon the values of the syntactic features and/or the semantic features at 308. Specifically, the syntactic and/or semantic features may be analyzed in order to identify spam hosts. Such analysis may be performed by a classifier.

Figure 4:
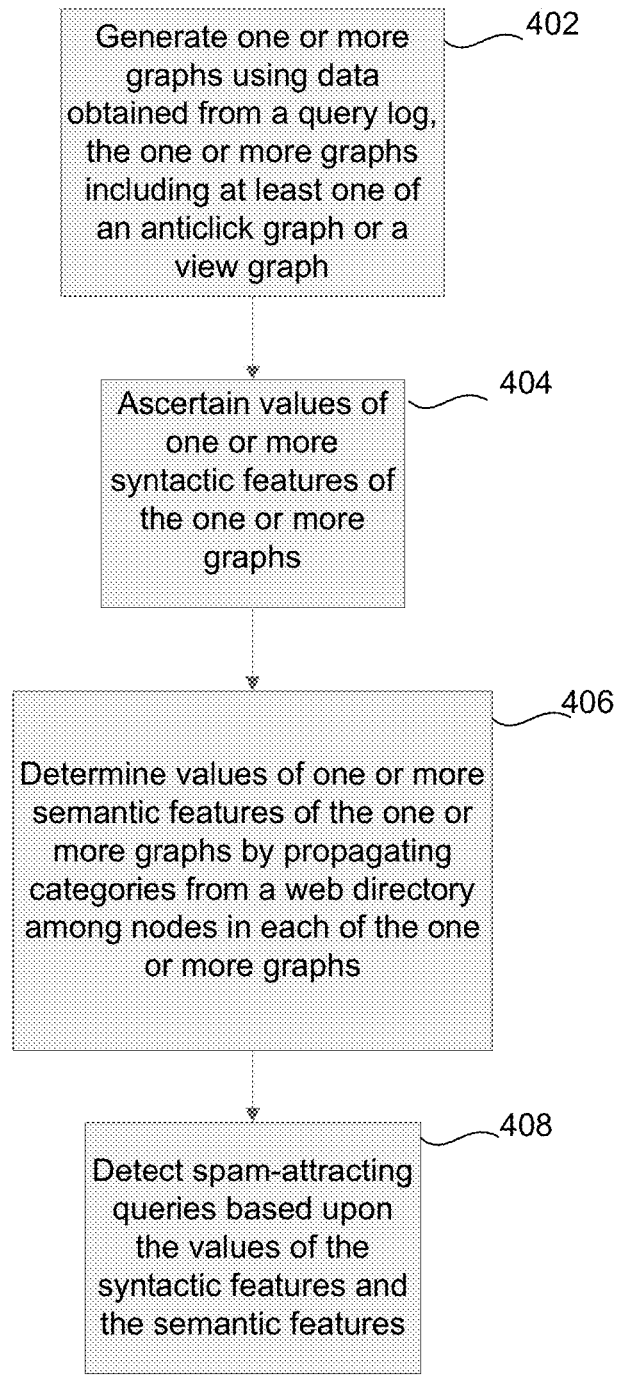
FIG. 4 is a process flow diagram illustrating a method of detecting spam-attracting queries.
Figure 5:
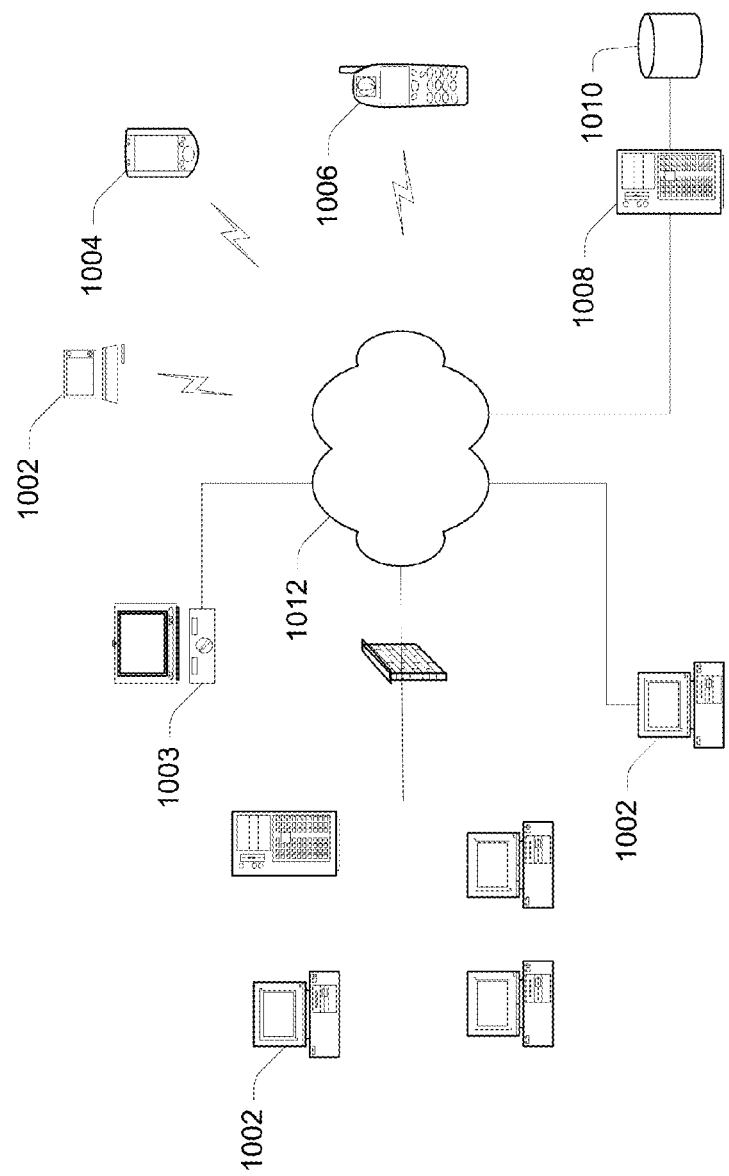
FIG. 5 is a simplified diagram of a network environment in which specific embodiments of the present invention may be implemented.
Figure 6:
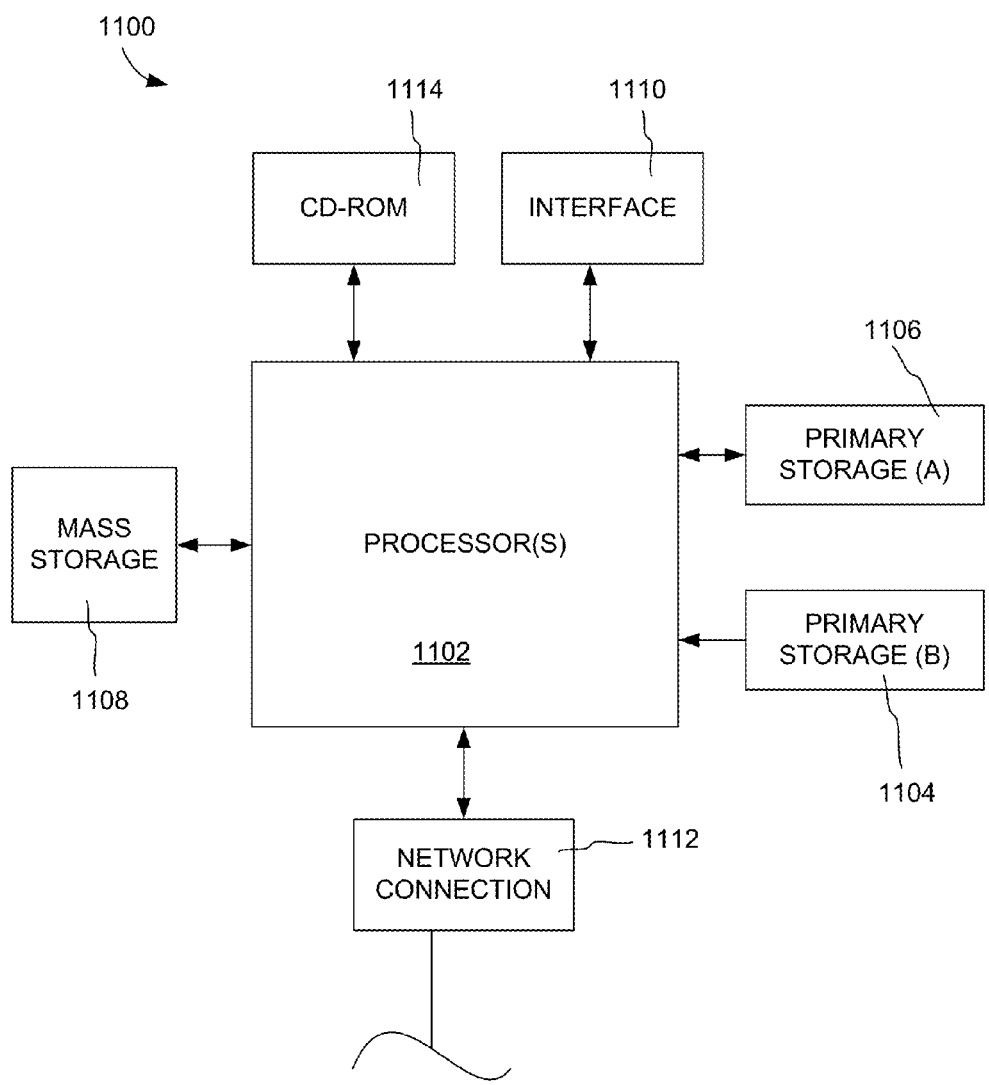
FIG. 6 illustrates an example computer system in which specific embodiments of the present invention may be implemented.

FIG. 4 is a process flow diagram illustrating an example method of detecting spam-attracting queries in accordance with one embodiment. The system may generate one or more graphs using data obtained from a query log, where the one or more graphs include at least one of an anticlick graph or a view graph at 402. More particularly, the graphs may include a click graph, an anticlick graph, and/or a view graph. The system may ascertain values of one or more syntactic features of the one or more graphs at 404. In addition, the system may determine values of one or more semantic features of the one or more graphs by propagating categories from a web directory among nodes in each of the one or more graphs at 406.

Specifically, one or more semantic features may be calculated with respect to query nodes (in a document-based query graph or host-based query graph). The system may then detect spam-attracting queries based upon the values of the syntactic features and/or semantic features at 408. Specifically, the syntactic and/or semantic features may be analyzed in order to identify spam attracting queries. Such analysis may be performed by a classifier.

A classifier capable of detecting spam hosts and/or spam-attracting queries may be a software program developed via machine-based learning. Specifically, a classifier may be generated using a training set of data (e.g., obtained from a query log). The training set of data may further indicate those queries in the query log that are spam-attracting queries, as well as those hosts in the query log that are spam hosts. Values associated with various syntactic and/or semantic features associated with the training set of data may be generated. From these values, various functions and/or vectors associated with these syntactic and/or semantic features may be identified. Such functions, vectors, and/or patterns may then be used to identify spam-attracting queries and/or spam hosts from syntactic and/or semantic feature values that are determined in another set of data (e.g., obtained from another query log).

Such a classifier may be used to identify a set of possible spam-attracting queries and/or possible spam hosts. The possible spam-attracting queries and/or possible spam hosts may be further analyzed via another (e.g., different or more substantial) classifier.

Once a spam-attracting query or spam host is identified, the results may be used to exclude various documents from search results. For instance, if a spam host is identified, the corresponding web page(s) or web site may be excluded from search results that are provided in response to a search query. Similarly, if a spam-attracting query is identified, the search results that are generated based upon the spam-attracting query may be analyzed via a more substantial classifier in order to filter the search results that are provided to the user that submitted the query.

Although specific semantic and syntactic features are described herein, the identification of spam-hosts and/or spam-attracting queries need not be based solely upon these semantic and syntactic features. Rather, other features may also be considered. Such features may include, for example, the number of pages that are clicked, the number of unique pages that are clicked, the total number of pages that are presented in a set of search results, the total number of unique pages that are presented in a set of search results, the total number of anticlick pages (e.g., pages that are not clicked), the total number of unique anticlick pages, the total number of URLs or hosts that are presented in a set of search results, the number of URLs that are clicked, the number of hosts that are clicked, the number of sessions in which at least one search result has been clicked by a user, the total number of sessions for which search results are presented, the number of queries for which at least one search result has been clicked by a user, the number of pages in the set of search results that do not include spam, the number of pages in the set of search results that include spam, the number of sessions that include a particular query, the number of queries for which search results are presented, the number of unique hosts in a set of search results, and/or the number of clicks that are associated with spam pages.

Embodiments of the present invention may be employed to process query logs in order to detect spam hosts or spam-attracting queries in any of a wide variety of computing contexts. For example, as illustrated in FIG. 10, implementations are contemplated in which users interact with a diverse network environment via any type of computer (e.g., desktop, laptop, tablet, etc.) 1002, media computing platforms 1003 (e.g., cable and satellite set top boxes and digital video recorders), handheld computing devices (e.g., PDAs) 1004, cell phones 1006, or any other type of computing or communication platform.

And according to various embodiments, input that is processed in accordance with the invention may be obtained using a wide variety of techniques. For example, a search query may be obtained from a user's interaction with a local application, web site or web-based application or service and may be accomplished using any of a variety of well known mechanisms for obtaining information from a user. However, it should be understood that such methods of obtaining input from a user are merely examples and that a search query may be obtained in many other ways.

Once a query log is generated and obtained, the query log may be processed according to the invention in some centralized manner. This is represented in FIG. 10 by server 1008 and data store 1010 which, as will be understood, may correspond to multiple distributed devices and data stores. The invention may also be practiced in a wide variety of network environments (represented by network 1012) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. The spam detecting apparatus of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store query logs, information associated with query graphs, various feature values including semantic and/or syntactic feature values, category trees that are generated for nodes of query graphs, results of the spam detection process and summaries thereof, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks;

magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

FIG. 11 illustrates a typical computer system that, when appropriately configured or designed, can serve as a system of this invention. The computer system 1100 includes any number of processors 1102 (also referred to as central processing units, or CPUs) that are coupled to storage devices including primary storage 1106 (typically a random access memory, or RAM), primary storage 1104 (typically a read only memory, or ROM). CPU 1102 may be of various types including microcontrollers and microprocessors such as programmable devices (e.g., CPLDs and FPGAs) and unprogrammable devices such as gate array ASICs or general purpose microprocessors. As is well known in the art, primary storage 1104 acts to transfer data and instructions uni-directionally to the CPU and primary storage 1106 is used typically to transfer data and instructions in a bi-directional manner. Both of these primary storage devices may include any suitable computer-readable media such as those described above. A mass storage device 1108 is also coupled bi-directionally to CPU 1102 and provides additional data storage capacity and may include any of the computer-readable media described above. Mass storage device 1108 may be used to store programs, data and the like and is typically a secondary storage medium such as a hard disk. It will be appreciated that the information retained within the mass storage device 1108, may, in appropriate cases, be incorporated in standard fashion as part of primary storage 1106 as virtual memory. A specific mass storage device such as a CD-ROM 1114 may also pass data uni-directionally to the CPU.

CPU 1102 may also be coupled to an interface 1110 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1102 optionally may be coupled to an external device such as a database or a computer or telecommunications network using an external connection as shown generally at 1112. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
generating by a network device one or more graphs using data obtained from a query log, the one or more graphs including an anticlick graph, wherein the anticlick graph represents information pertaining to documents in previously provided search results that, according to the data obtained from the query log, have not been clicked by a user that submitted a corresponding search query and does not represent information pertaining to documents in the previously provided search results that, according to the data obtained from the query log, have been clicked by the user that submitted the corresponding search query, wherein the anticlick graph includes one or more nodes representing or corresponding to documents that, according to the data obtained from the query log, have not been clicked by the user that submitted the corresponding search query;
ascertaining by the network device values of one or more syntactic features of the one or more graphs;
determining by the network device values of one or more semantic features of the one or more graphs by propagating categories from a web directory among nodes in each of the one or more graphs; and
detecting by the network device spam hosts based upon the values of the syntactic features and the semantic features;
wherein the anti-click graph includes a host-based graph or a document-based graph, wherein the nodes of the host-based graph includes one or more host nodes representing hosts corresponding to the documents that, according to the data obtained from the query log, have not been clicked by the user that submitted the corresponding search query, and wherein the nodes of the document-based graph includes one or more document nodes representing the documents that, according to the data obtained from the query log, have not been clicked by the user that submitted the corresponding search query.

2. The method as recited in claim 1, wherein the one or more semantic features comprise one or more measures of dispersion of each of the host nodes in the host-based graph.

3. The method as recited in claim 1, wherein the one or more semantic features comprise one or more measures of dispersion of each of the document nodes in the document-based graph.

4. The method as recited in claim 1, wherein the one or more graphs further comprise a click graph.

5. The method as recited in claim 1, wherein the one or more graphs further comprise a click graph and a view graph.

6. The method as recited in claim 1, wherein the one or more syntactic features of the one or more graphs includes at least one of topQx or topTy.

7. The method as recited in claim 6, wherein x is 1 and y is 1.

8. The method as recited in claim 6, wherein x is 100 and y is 100.

9. The method as recited in claim 1, wherein propagating is performed using a tree-based propagation by weighted average.

10. The method as recited in claim 1, wherein propagating is performed by random walk.

11. The method as recited in claim 1, wherein the web directory is DMOZ.

12. The method as recited in claim 1, wherein determining values of the one or more semantic features of the one or more graphs further comprises:
categorizing by the network device a subset of hosts in the anti-click graph that can found in a web directory that includes a plurality of categories such that each of the subset of hosts is associated with one or more of the plurality of categories; and
propagating by the network device the one or more of the plurality of categories to other host nodes and query nodes in the anti-click graph such that each node in the anti-click graph has an associated category tree.

13. The method as recited in claim 1, wherein determining values of the one or more semantic features of the one or more graphs further comprises:

categorizing by the network device a subset of documents in the anti-click graph that can found in a web directory that includes a plurality of categories such that each of the subset of documents is associated with one or more of the plurality of categories; and propagating by the network device the one or more of the plurality of categories to other document nodes and query nodes in the anti-click graph such that each node in the anti-click graph has an associated category tree.

14. The method as recited in claim 13, further comprising: associating by the network device a score with each category tree, wherein the category tree indicates a semantic spread of the corresponding node.

15. A non-transitory computer-readable medium storing thereon computer-readable instructions, comprising:

instructions for generating one or more graphs using data obtained from a query log, the one or more graphs including an anticlick graph, wherein the anticlick graph represents information pertaining to search results that, according to the data obtained from the query log, have not been clicked by a user that submitted a corresponding search query and does not represent information pertaining to search results that, according to the data obtained from the query log, have been clicked by the user that submitted the corresponding search query, wherein the anticlick graph includes one or more edges, the one or more edges being between a query and the corresponding search results that, according to the data obtained from the query log, have not been clicked by the user that submitted the query;

instructions for propagating categories from a web directory among nodes in each of the one or more graphs;

instructions for determining values of one or more semantic features of the one or more graphs after propagating categories among the nodes; and instructions for detecting spam hosts based upon the values of the semantic features;

wherein the anti-click graph includes a host-based graph or a document-based graph, wherein the nodes of the host-based graph includes one or more host nodes representing hosts corresponding to the documents that, according to the data obtained from the query log, have not been clicked by the user that submitted the corresponding search query, and wherein the nodes of the document-based graph includes one or more document nodes representing the documents that, according to the data obtained from the query log, have not been clicked by the user that submitted the corresponding search query.

16. An apparatus, comprising:
a processor; and
a memory, at least one of the processor or the memory being adapted for:

generating one or more graphs using data obtained from a query log, the one or more graphs including an anticlick graph, wherein the anticlick graph represents a search query and information pertaining to documents in corresponding search results that, according to the data obtained from the query log, have not been clicked by a user that submitted the search query, wherein the anticlick graph does not represent information pertaining to documents in the corresponding search results that, according to the data obtained from the query log, have been clicked by the user that submitted the search query, wherein the anticlick graph includes one or more edges, the one or more edges being between a query and the corresponding search results that, according to the data obtained from the query log, have not been clicked by the user that submitted the query;

ascertaining values of one or more syntactic features of the one or more graphs;

propagating categories from a web directory among nodes in each of the one or more graphs;

determining values of one or more semantic features of the one or more graphs; and detecting spam hosts using the values of the syntactic features and the semantic features;

wherein the anti-click graph includes a host-based graph or a document-based graph, wherein the nodes of the host-based graph includes one or more host nodes representing hosts corresponding to the documents that, according to the data obtained from the query log, have not been clicked by the user that submitted the corresponding search query, and wherein the nodes of the document-based graph includes one or more document nodes representing the documents that, according to the data obtained from the query log, have not been clicked by the user that submitted the corresponding search query.

17. The apparatus as recited in claim 16, wherein the one or more semantic features comprise one or more measures of dispersion of each document node or host node in the one or more graphs.

18. The apparatus as recited in claim 16, wherein the one or more syntactic features of the one or more graphs comprises at least one of topQx or topTy.

19. The apparatus as recited in claim 16, wherein the search results that have not been clicked by the user that submitted the query and are represented in the anti-click graph were, according to the data obtained from the query log, ranked in the search results before one of the search results that have been clicked by the user that submitted the query.

20. The apparatus as recited in claim 16, wherein the search results that have not been clicked by the user that submitted the query and are represented in the anti-click graph were, according to the data obtained from the query log, ranked in the search results before a first one of the search results that have been clicked by the user that submitted the query.

* * * * *